April 25, 1944.  J. S. SOUSA  2,347,335
DITCH CLEANER
Filed Dec. 23, 1942  2 Sheets-Sheet 2
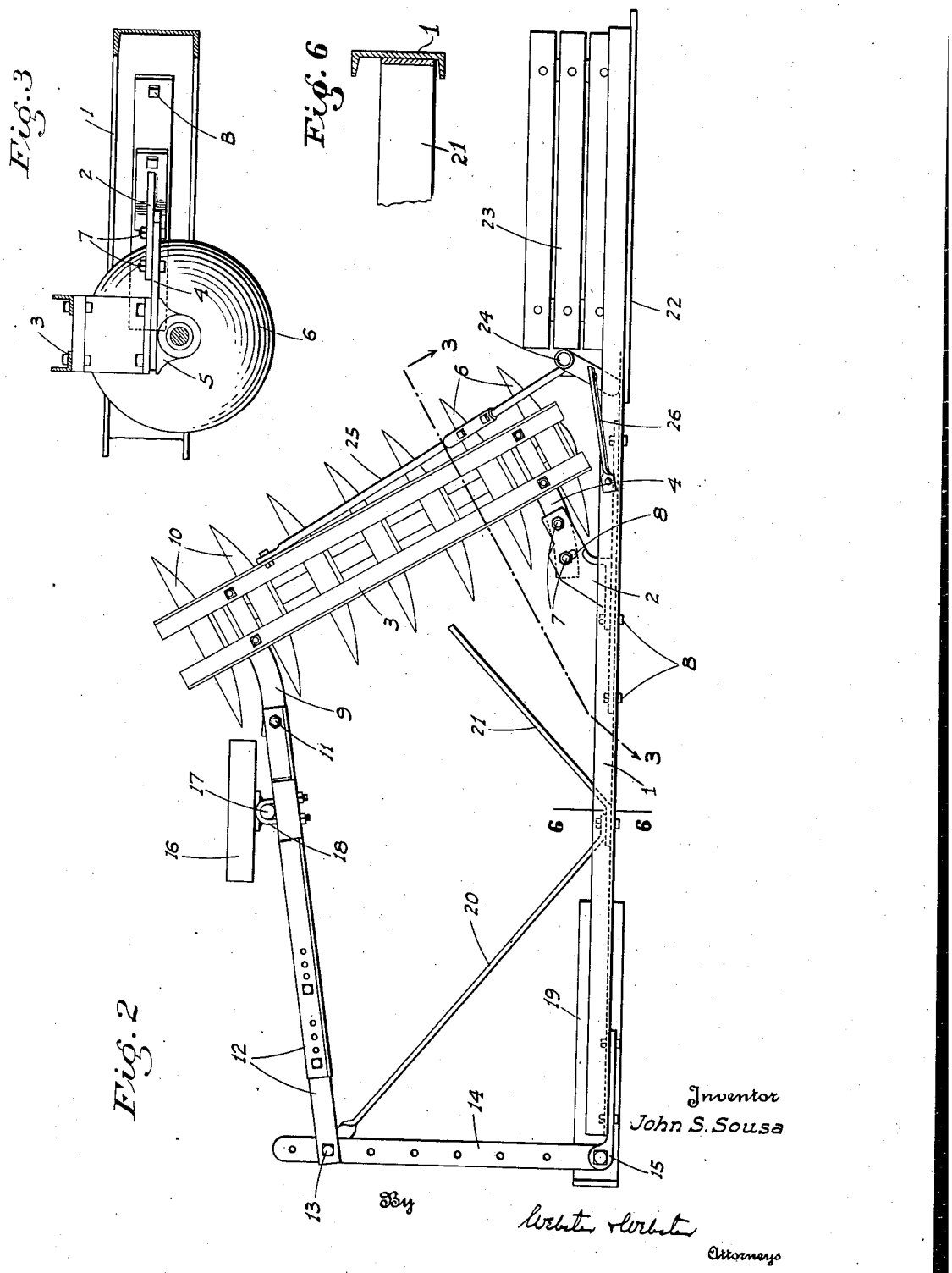
Inventor
John S. Sousa Patented Apr. 25, 1944

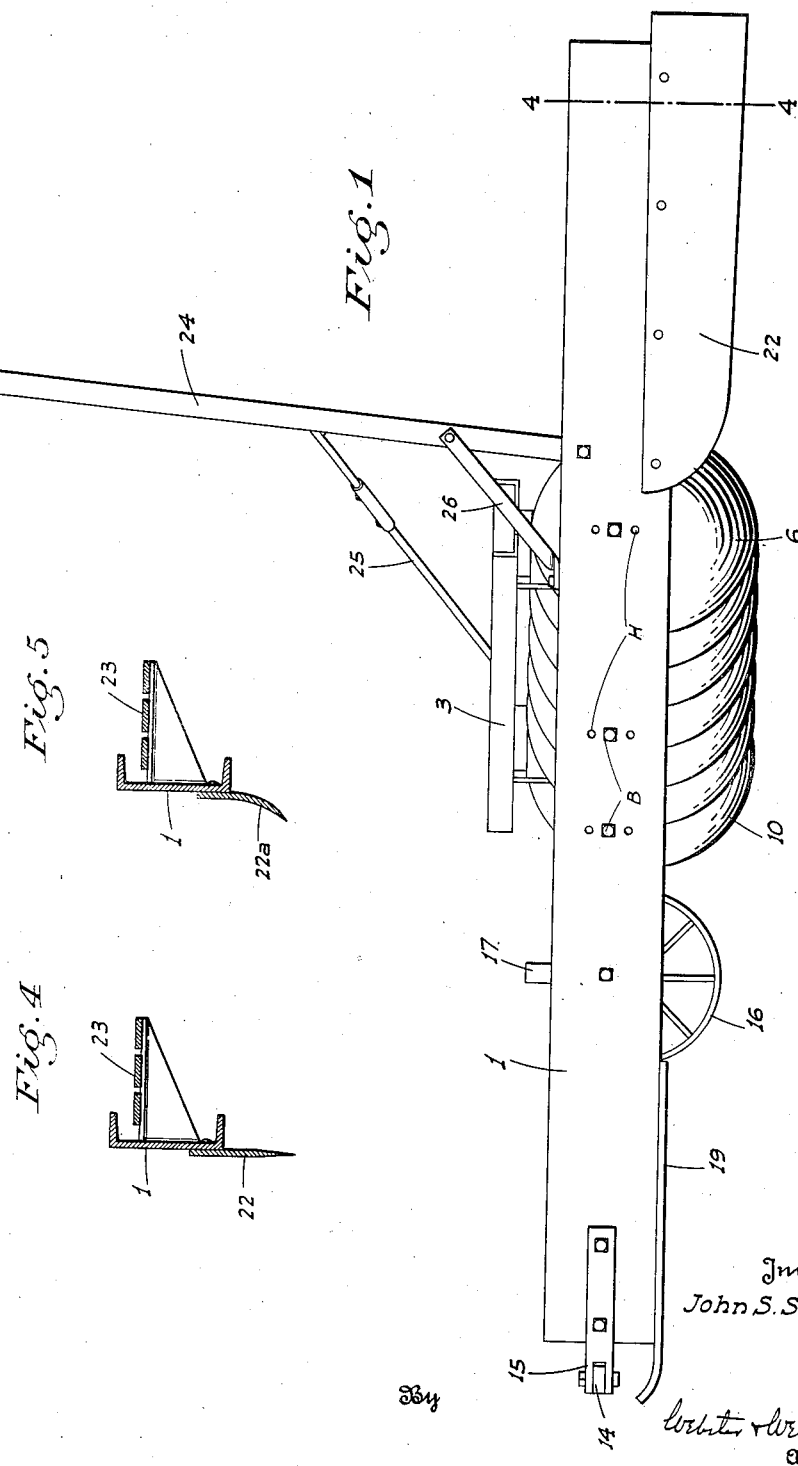

2,347,335

UNITED STATES PATENT OFFICE 2,347,335

DITCH CLEANER

John S. Sousa, Goshen, Calif.

Application December 23, 1942, Serial No. 469,936

3 Claims. (Cl. 37—80)

This invention relates in general to an improved earth working implement, and in particular the invention is directed to, and it is the principal object to provide, a tractor-drawn ditch cleaner which includes a disc gang and a draft assembly in novel combination.

A further object of the instant invention is to provide a tractor-drawn ditch cleaner which comprises an elongated draft frame, a disc gang projecting laterally in normally rigid but adjustable relation from one side of the draft frame intermediate its ends, said draft frame being adapted to move along the bottom of a ditch with the disc gang riding and cleaning or cultivating one side or wall of the ditch, and an elongated, anti-side draft blade mounted on the draft frame adjacent the rear end of the latter, said anti-side draft blade being disposed edgewise to the ground and extending some distance below the draft frame for substantial ground penetration.

An additional object of the invention is to provide a tractor-drawn ditch cleaner, as in the preceding paragraph, in which the draft frame includes a novel bracing assembly arranged to maintain the disc gang in rigid but adjustable relation to said frame; there being a ground engaging supporting wheel swivelly mounted in connection with said assembly adjacent the outer end of the disc gang whereby to support the same and prevent said end of the gang from digging too deeply into the ditch bank.

An additional object of this invention is to provide a ditch cleaner of the type described which includes an operator's platform mounted on the elongated draft frame adjacent but rearwardly of the inner end of the disc gang, and a grab post of substantial height secured on and upstanding from the draft frame adjacent the forward end of said platform.

A still further object of this invention is to provide a ditch cleaner which includes a conventional disc gang; said disc gang being mounted in connection with the remainder of the implement in such way that with a minimum of effort said disc gang can be detached for other and usual uses.

While I have above described the device generally as being tractor drawn, it is obvious that draft animals may be employed instead of a tractor.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of the implement taken from the side opposite the disc gang.

Figure 2 is a top plan view of the implement.

Figure 3 is a cross section on line 3—3 of Fig. 2.

Figure 4 is a cross section on line 4—4 of Fig. 1, illustrating one form of the anti-side draft blade.

Figure 5 is a similar view illustrating a different form of anti-side draft blade.

Figure 6 is a cross section on line 6—6 of Fig. 2.

Referring now more particularly to the characters of reference on the drawings, the implement comprises an elongated draft beam 1 which is formed from heavy-duty channel iron disposed on edge. Intermediate its ends the draft beam 1 is provided with a laterally projecting fitting or bracket 2 of generally L-shape, which turns rearwardly.

From a point rearwardly of the fitting 2 and adjacent the draft beam 1, a disc gang 3 of conventional form extends laterally relative to said draft beam 1 and at a forward angle. An attachment arm 4 is secured in connection with the bearing block assembly 5 between the innermost pair of discs 6 and projects forwardly with a laterally outward curvature, as shown. The outer end portion of arm 4 laps under the fitting 2; these two parts being connected by spaced bolts 7, the foremost bolt hole in the fitting 2 being elongated, as at 8, to permit of relative horizontal adjustment of said lapped parts and to permit of adjustment of the angle of disc gang 3, as will hereinafter appear.

Another attachment arm 9 of the same configuration as the arm 4, and similarly mounted, projects forwardly from between the outermost pair of discs 10 of the disc gang 3. The forward end of attachment 9 is connected, as at 11, with the rear end of a tension bar unit 12 which is adjustable to change its effective length. The forward end of tension bar unit 12 is connected as at 13 to a laterally projecting beam 14, the inner end of said beam being connected to a clevis plate 15 which is secured on the forward end of the beam 1 and projects slightly therebeyond. The lateral beam 14 is provided with a series of holes, as shown, so that a draft chain or the like from the tractor may be connected to said beam at a selective point.

Intermediate the ends of tension bar unit 12, said unit is supported by a ground engaging wheel 16. The mount for said wheel includes an upstanding post 17 vertically adjustably secured to the tension bar unit 12 by means of a U-bolt 18.

A ground engaging shoe or skid 19 is fixed to the bottom draft beam 1 at its forward end, and a suitable brace 20 extends from the outer end portion of beam 14 diagonally to connection with beam 1 a short distance rearwardly of the skid 19. A rigid sweep 21 is secured to the beam 1 between the skid 19 and the fitting 2; said sweep extending rearwardly toward the disc gang in diverging relation to the draft beam 1.

At its rear end portion, and rearwardly of the inner end of the disc gang 3, the draft beam 1 is fitted with an elongated anti-side draft blade 22 which is secured to the side of said draft beam in edgewise relation to the ground; said blade extending some distance below the lower edge of beam 1 whereby to substantially penetrate the ground when the implement is in use. To facilitate such penetration of the blade 22 the forward end thereof is rounded as shown.

In the embodiment shown in Fig. 4 the blade 22 is straight in cross section. A modified form of anti-side draft blade is shown in Fig. 5, wherein the blade 22a curves laterally in section and toward its lower edge, such curvature being in a direction away from the disc gang 3.

An operator's platform 23 is mounted in connection with the draft beam 1 rearwardly of the disc gang 3, said platform projecting from the same side of beam 1 as the disc gang. A rigid grab post 24 of substantial height is fixed at its lower end in connection with the draft beam 1 immediately ahead of the platform 23, and said post extends upwardly at a slight angle toward the side from which the disc gang projects.

A sectional brace 25 connects between the post 24 intermediate its ends and the disc gang 3 adjacent its outer end, while another relatively short brace 26 connects diagonally between the post and the beam 1 forwardly of said post.

In use, the implement is disposed in the ditch to be cleaned with the draft beam 1 extending lengthwise of the ditch and substantially centrally between the sides thereof. The beam 14 is connected to the tractor by a suitable flexible coupling element such as a chain (not shown); the point of connection of said coupling element with beam 14 depending on the necessary angle of draft.

When in position in the ditch the disc gang 3 extends up the side of the ditch, which imparts a slight lateral cant to the draft beam 1. With forward movement of the implement, the disc gang 3 effectively cleans or cultivates the corresponding ditch bank, and the sweep 21 deflects a certain portion of the dirt and debris so that the inner end of the disc gang 3 does not become overloaded.

The draft beam 1 is maintained in the bottom of the ditch in proper position by means of the elongated blade 22 which digs into the ground to some depth and effectively resists the side draft imparted by the disc gang 3. Under some conditions a transversely curved blade, as shown in Fig. 5, is desirable, as this form of blade has been found to afford greater resistance to side draft. Both blades are sharp edged.

In order to assure that the blade 22 penetrates the ground an operator stands on platform 23, the operator's weight causing the blade 22 to so penetrate the ground, and in addition the operator, by grabbing post 24 and exerting lateral pressure thereon, can effect a certain amount of control of the cutting depth of the disc gang 3.

If it is desired to change the angle of the disc gang 3 relative to the draft beam 1, the bolts 7 and 11 are loosened and the tension bar unit 12 either extended or contracted, whereupon all of the bolts are retightened.

By reason of the manner in which the disc gang is connected with the remainder of the implement it can be readily detached for other uses by merely detaching the arms 4 and 9 from the fitting 2 and tension bar unit 12 respectively, together with detachment of the lower end of the post brace 25.

Beam 1 is provided with vertical rows of holes H for the bolts B by which the fitting 2 is secured to said beam, so that the level of the beam relative to the fitting may be adjusted.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A ditch cleaner comprising an elongated draft beam, a disc gang projecting laterally from one side of the draft beam intermediate its ends, means rigidly securing the disc gang in connection with the draft beam, an operator's platform mounted on said beam rearwardly of but adjacent the disc gang, a grab post fixed on and upstanding from said beam adjacent the forward end of the platform, and a rigid brace connected at one end with the grab post and extending therefrom laterally at a downward slope to connection with the disc gang adjacent its outer end.

2. A ditch cleaner comprising an elongated draft beam, a disc gang projecting laterally from one side of the draft beam intermediate its ends, means connecting the disc gang adjacent its inner end with the draft beam, a lateral beam projecting in rigid relation from the same side of the draft beam as the disc gang from a point ahead of said gang, a tension link connected between outer end portion of the disc gang and said lateral beam, a ground engaging wheel mounted on the link closely adjacent said outer end portion of the disc gang; said connecting means being arranged to permit of adjustment of the angle of projection of the disc gang and means to adjust the effective length of the link; the point of adjustment of said link being ahead of the wheel.

3. A ditch cleaner comprising an elongated draft beam, a disc gang projecting laterally from one side of the draft beam intermediate its ends and at a forward angle thereto, means rigidly securing the disc gang in connection with the draft beam, an anti-side draft blade mounted in connection with the draft beam rearwardly of the disc gang, and a rigid sweep mounted in connection with the draft beam ahead of the disc gang; said sweep projecting rearwardly toward the disc gang in diverging relation to the draft beam.

JOHN S. SOUSA.